United States Patent [19]

Silbernagel

[11] 4,264,048
[45] Apr. 28, 1981

[54] RETAINING CLIP

[76] Inventor: Hermann Silbernagel, Uhlandstrasse 7, 6800 Mannheim 1, Fed. Rep. of Germany

[21] Appl. No.: 71,081

[22] Filed: Aug. 31, 1979

[30] Foreign Application Priority Data

Nov. 11, 1978 [DE] Fed. Rep. of Germany ... 7833633[U]

[51] Int. Cl.³ .............................................. A47B 96/06
[52] U.S. Cl. .................................. 248/229; 24/243 B; 248/539
[58] Field of Search ............... 248/539, 230, 228, 229, 248/226.4, 225.4, 226.3; 24/243 B, 263 A

[56] References Cited

U.S. PATENT DOCUMENTS

| 421,907 | 2/1890 | Casler | 24/243 B UX |
| 2,044,700 | 6/1936 | Jones | 248/229 UX |
| 2,187,642 | 1/1940 | Brown | 24/243 B UX |
| 2,259,779 | 10/1941 | Romig | 248/539 X |
| 3,111,297 | 11/1963 | Conner | 248/225.4 X |
| 3,508,732 | 4/1970 | Trachtenberg | 248/226.3 |
| 3,535,751 | 10/1970 | Batchelor | 24/263 A |
| 3,950,874 | 4/1976 | Diggs | 248/539 X |

FOREIGN PATENT DOCUMENTS 590507 1/1934 Fed. Rep. of Germany .......... 248/230

Primary Examiner—J. Franklin Foss
Attorney, Agent, or Firm—Staas and Halsey

[57] ABSTRACT

A retaining clip for attaching signs to guardrails along highways comprising a body section having a central portion with at least two side flanges therealong, a clamp provided at each end of the body section and integral therewith, each clamp terminating in a closed portion, a wedge-shaped member having a pair of slots therein slidably mounted upon one of the clamps, and a turn screw threadably mounted in the central portion of the body having a hammer head at one end and a pressure plate for engagement with a guardrail at the other end.

6 Claims, 2 Drawing Figures

RETAINING CLIP

BACKGROUND OF THE INVENTION

1. Field of the Invention

The invention relates to a retaining clip for rods, pipes or sectional strips to be detachably fastened to another sectional strip. The invention is particularly concerned with the mounting of traffic signs which shall be attached to pipes and, in particular, shall be mounted on guardrails of freeways.

2. Description of the Prior Art

Such guardrails have become established on freeways and on certain raised sections of other roads for traffic safety. They are designed to prevent motor vehicles from going off the roadway. To flexibly intercept motor vehicles which do go off the roadway, said guardrails are generally mounted with a certain inclination such that the upper part of the guardrail projects over the lower part. Thus, an automobile bumping into such a guardrail must first bend the guardrail in a vertical direction, with part of the impact already being absorbed before it deforms or destroys the guardrail itself.

Now, if it is desired to mount signs temporarily near the edge of the roadway, it is possible to utilize guardrails as mounting devices, because they are already firmly anchored in the ground. Like guardrails, signs are usually mounted by anchoring them with a small foundation in the ground. Heretofore, to obviate the need for a separate foundation, signs have frequently been mounted directly on the guardrail itself.

This method is particularly useful when, for example, a sign shall be temporarily mounted at a construction site, with the sign being bolted into the guardrails by means of mounting brackets and/or clamps of known construction. In this case, it is necessary to keep on hand a variety of clamps with appropriate inside diameters for various types of signs. Also, mounting brackets of varying widths must be kept on hand for signs of different sizes and weights. Heretofore, brackets and clamps have been bolted into the guardrails by drilling holes in the guardrails.

Thus, the disadvantages are obvious. The drilling of holes in the guardrail entails the use of complex tools, e.g., electric boring machines. However, particularly in uninhabited regions where there is no electric power, it is cumbersome to use such boring machines. A further disadvantage is that the fitters must carry a variety of brackets and clamps for different signs. An additional problem is the inclination of the guardrails. Unlike guardrails, signs must be mounted vertically. This can only be done by bending the brackets, but pliable brackets are unstable and impair the installation stability of the traffic signs.

SUMMARY OF THE INVENTION

It is an object of the present invention to get away from the above described fastening methods as a matter of principle, that is, to avoid bore holes, brackets, and clamps. Still, the traffic signs must be installed such as to assure at least as stable a mounting as can be achieved by conventional methods.

Another object of the invention is aimed at permitting the installation of traffic signs without the use of complex tools, such as boreing machines, which may also be difficult to put into operation. In this way, one avoids causing irreparable damage to the guardrails by the bore holes.

According to the present invention, the problem is solved by attaching the signs which are fastened to holding pipes by connecting same onto the guardrails by means of a retaining clip. Such a retaining clip operates like a screw clamp of known construction, the difference being that the retaining clip embodying the principles of the invention not only urges the holding pipe against the guardrail, but also prevents the two parts from working loose from one another. The pressure through which the holding pipe and guardrail are urged against one another is generated by a screw. To facilitate mounting, at one end of the screw there is a lever or a hammer head, by means of which the screw can easily be tightened manually.

The inclination of the guardrail is overcome because the retaining clip according to the invention carries a slidable wedge adjuster which can be moved between the holding pipe of a traffic sign and the guardrail just far enough to permit vertical mounting of the traffic sign.

The main body of the retaining clip according to the invention is in the shape of a U-section having a middle portion and sides. In the middle portion of the U-section is a threaded bore hole, through which a screw is threaded. Preferably, the screw is designed as a hammer-head screw carrying a pressure plate at its other end. The pressure plate may be rigidly or rotatably fastened to the screw. At the ends, the U-section body carries clamps. The legs of the clamps are fastened to the ends of the U-section body. Normally, the clamps are welded onto the ends, but they may also be screwed thereonto. Normally, clamps terminate semicylindrically, that is, the clamps are bent rods having extended legs with a semi-circular connection at the connecting end, and the other end open. However, this design of the clamps is desirable only if the traffic signs are attached to ordinary pipes. If the traffic sign is mounted on a square pipe, it is recommended that clamps be used that terminate rectangularly.

Each retainer clip carries only one wedge. This wedge is carried by a clamp through slots or elongated holes. Like the tip of the wedge, the elongated holes point toward the other clamp of the retainer clip. The legs of the clamp carrying the wedge are slightly longer than those of the other clamp. Because of the elongated holes, the wedge can be slid along its length toward the other clamp, or away therefrom. Thus, it operates like a support chock for the retainer clip of varying width between the holding pipe of a traffic sign and the guardrail.

The normal use of the retaining clip consists in sliding the wedge between the guardrail and the holding pipe of the traffic sign so as to compensate for the inclination of the guardrail. Since, normally, the upper part of the guardrail is inclined forwardly, the wedge must, as a rule, be pushed in on the lower part of the guardrail. However, the retaining clip according to the invention can also be used differently if the lower part of the guardrail is inclined forwardly. In this case, the wedge is pushed in on the upper part of the guardrail.

These together with other objects and advantages which will become subsequently apparent reside in the details of construction and oepration as more fully hereinafter described and claimed, reference being had to the accompanying drawings forming a part hereof, wherein like numerals refer to like parts throughout.

DESCRIPTION OF THE PREFERRED EMBODIMENT

Figure 1:
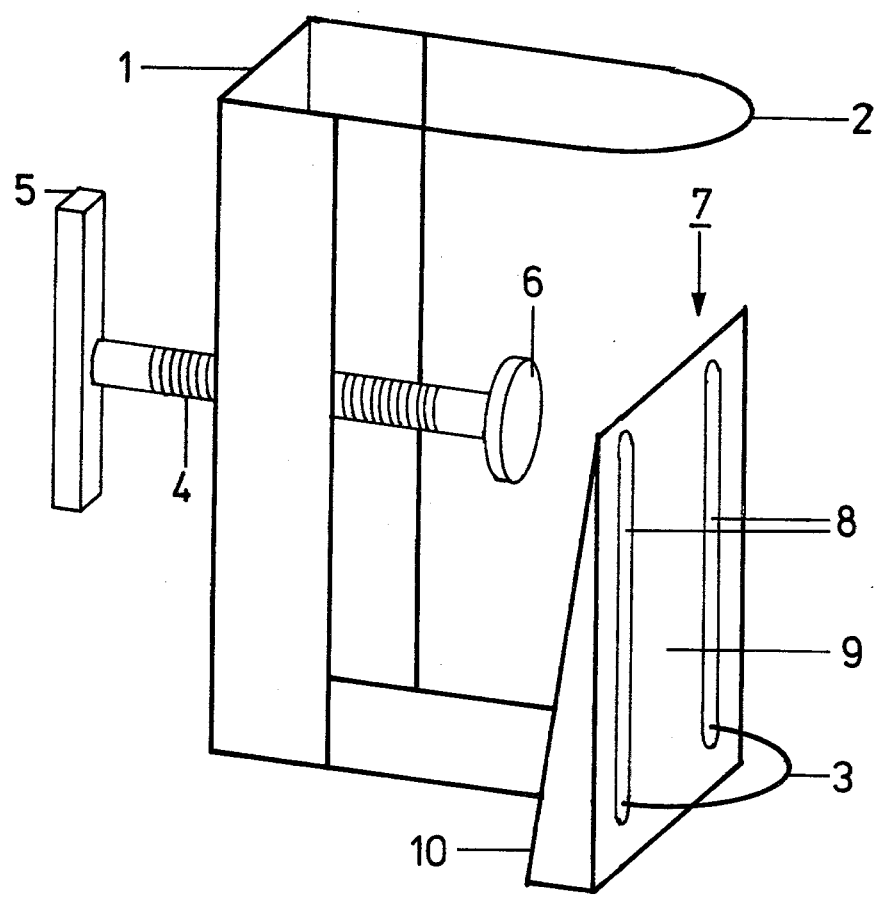
FIG. 1 shows the retaining clip of the present invention.

FIG. 1 shows the upper end of a U-section body 1 carrying an upper pipe clamp 2, the legs of which are slightly shorter than the lower pipe claim 3 which, in similar fashion, is carried by the lower end of the U-section body 1. In the center portion of the U-section body 1 is a screw 4 threaded through a bore hole having threads (concealed from view in FIG. 1 by one side of the U-section body). The screw 4 is preferably designed as a hammer-head 5 screw, having attached at the end opposite the head a pressure plate 6, which may be rigidly or rotatably fastened thereto.

Wedge 7 is suspended by the lower clamp 3. For this purpose, slots or elongated holes 8 are provided along wedge 7. The slots 8 are sufficiently wide to permit free play of the wedge with respect to the clamp 3. The outer surface 9 of the wedge points outwardly, its inner surface 10 pointing inwardly. Because of elongated holes 8, wedge 7 can be slid along the lower clamp 3 along its length, the tip of the wedge pointing to the upper clamp 2.

Figure 2:
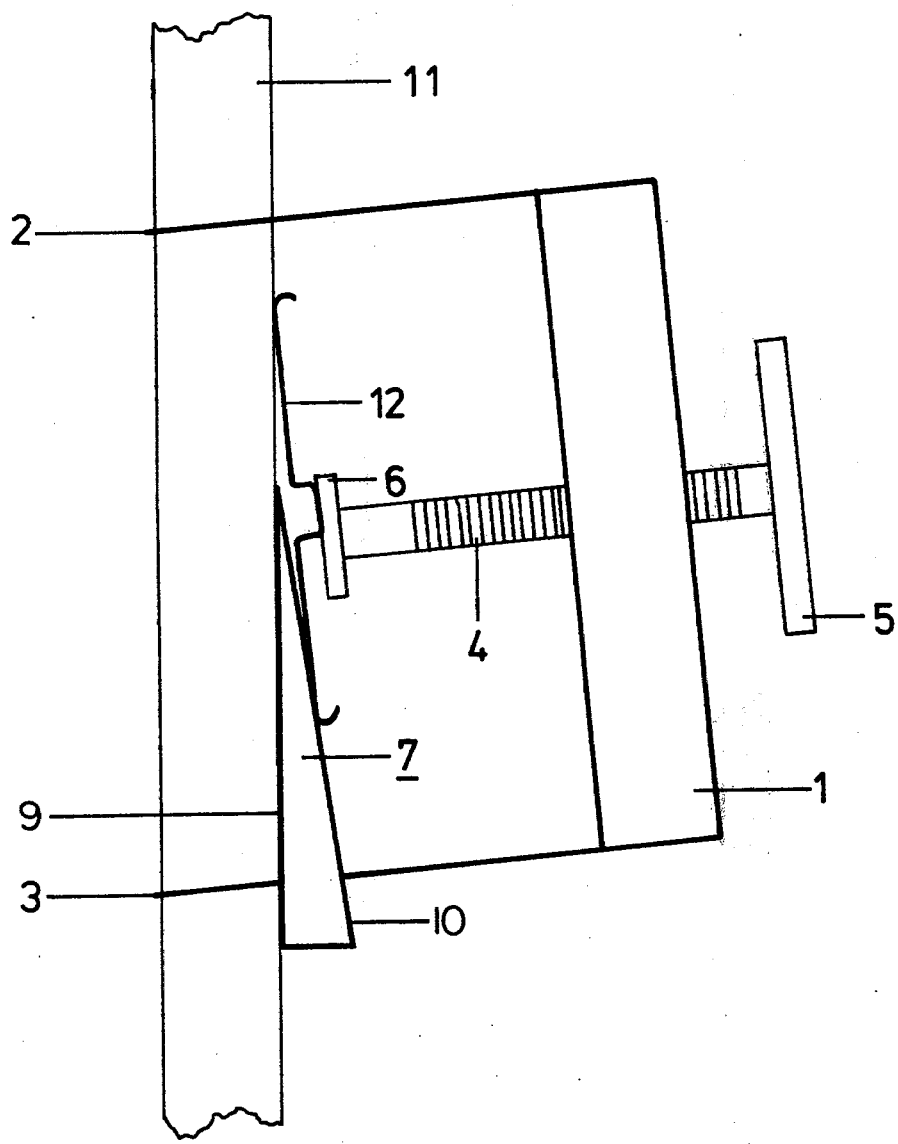
FIG. 2 illustrates a typical application of the retaining clip.

FIG. 2 shows a typical use of the retaining clip according to the invention for mounting to a guardrail a traffic sign as supported by a holding pipe 11. The holding pipe 11 being attached to a guide rail 12. As usual, the upper part of the guiderail is inclined slightly forwardly. It is urged by pressure plate 6 of screw 4 against holding pipe 11 of the traffic sign and against wedge 7 in the lower clamp 3. In the process, holding pipe 11 in clamps 2, 3 is urged to the outer stop or terminal portion of clamps 2 and 3. It is irrelevant whether holding pipe 11 is round or has a square section because the terminal portions of clamps 2 and 3 may be designed to complement same. Outer surface 9 of the wedge encloses holding pipe 11, while inner surface 10 of the wedge bears against guardrail 12. Thus, wedge 7 acts as a shim or chock between holdng pipe 11 and guardrail 12. Screw 4 can easily be tightened by turning or hitting its hammer head 5.

Turned upside down, FIG. 2 shows the application of the retaining clip of the invention if the lower part of the guardrail is inclined slightly forwardly. Because wedge 7 is slidable in slots or elongated holes 8, it can be utilized to compensate for any normal or usual inclinations of guardrail 12, so that the sign on its holding pipe 11 will be vertical or perpendicular to the ground.

The sign as mounted by the retaining clip of the invention can just as easily and quickly be detached from the guardrail as it is mounted thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A retaining clip for attaching a removable sign quickly and easily to a conventional type guardrail along a highway comprising: a main body having a central portion and at least two side flanges therealong, a clamp affixed at the respective ends of the side flanges and to said body, each clamp terminating in a closed portion, a wedge member having a pair of slots therein slidably mounted upon one of said clamps, an adjusting means for tensioning the body against a guardrail when attaching a sign support to the opposite side of said guardrail by means of the clamps, and the wedge member having a slight taper thereto with the pointed tip of the wedge pointed towards the clamp on which it is not supported.

2. The structure set forth in claim 1, wherein said adjusting means includes a threaded turn screw threadably mounted within the middle portion of said body, and having a hammer head affixed at one end thereof and a pressure plate attached at the other end thereof.

3. The structure set forth in claim 2, wherein said pressure plate is rotatably attached to the turn screw at the one end thereof.

4. The structure set forth in claim 2, wherein said pressure plate is non-rotatably affixed to the said turn screw at the end thereof.

5. The structure set forth in claim 1, wherein said closed portion of each clamp is formed in a semi-circle for close engagement of a round pipe sign support, and each clamp having a pair of leg portions with one of each of the legs passing through one of said slots of the pair of slots in said wedge member.

6. The structure set forth in claim 5, wherein the removable sign mounted on said round pipe sign support may be attached to a slanted guardrail by placing said main body of the retaining clip against one side of said tilted guardrail and with the semicircular closed portions of each clamp around the sign support pipe inserting the wedge member as guided by the pair of slots just far enough between the pipe and the tilted guardrail so as to maintain the pipe vertically, and then tightening said adjusting means tightly against the guardrail for securing said sign support thereto.

* * * * *